Jan. 13, 1931.  G. C. SUTTON ET AL  1,788,602
SPEED REDUCTION MECHANISM
Filed March 31, 1930   2 Sheets-Sheet 1

INVENTOR
Grover C. Sutton
BY Peter N. Mitschge
Carl N. Crawford
ATTORNEY

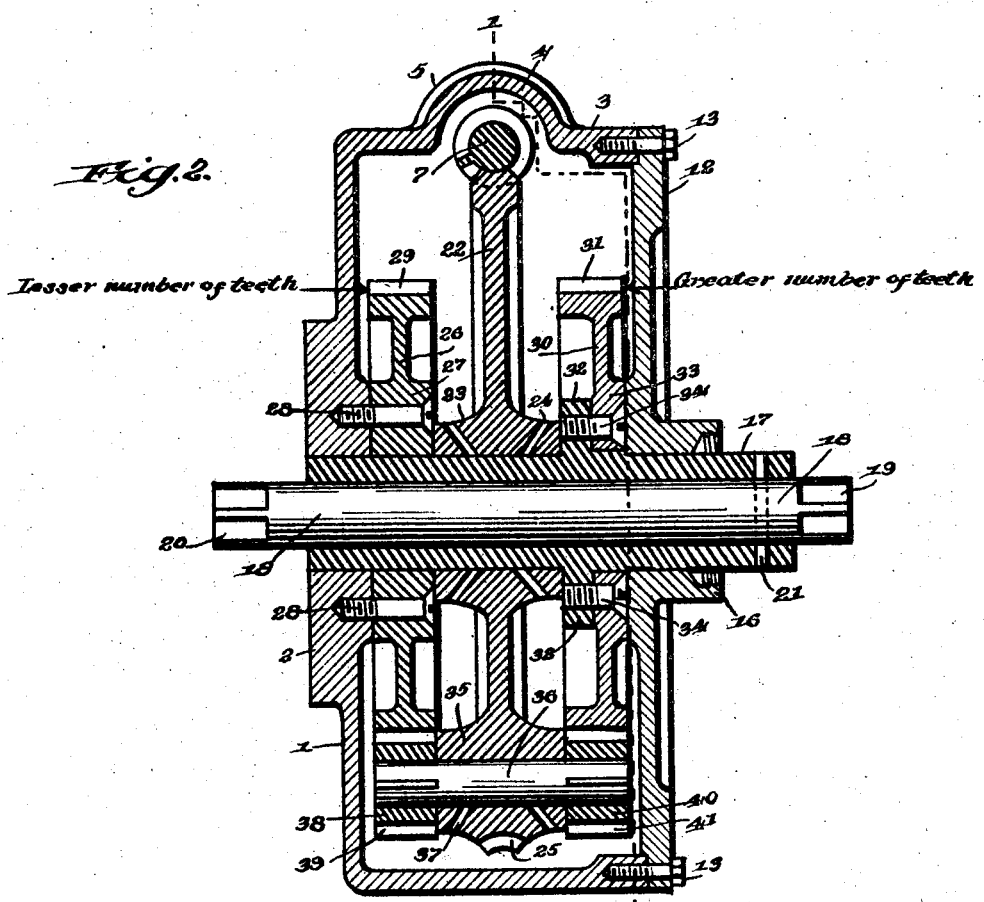
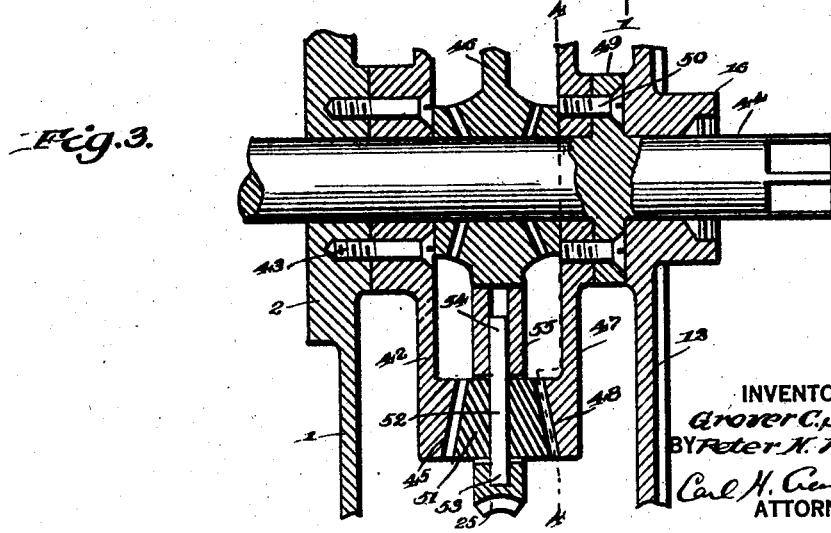

Patented Jan. 13, 1931

1,788,602

UNITED STATES PATENT OFFICE

GROVER C. SUTTON AND PETER H. WITSCHGE, OF SPOKANE, WASHINGTON, ASSIGNORS TO GENERAL MACHINERY COMPANY, OF SPOKANE, WASHINGTON, A CORPORATION OF WASHINGTON

SPEED-REDUCTION MECHANISM

Application filed March 31, 1930. Serial No. 440,483.

The object of this invention is to provide a novel speed reduction device or mechanism that is particularly designed and intended for light duty service. This invention is intensively distinguished form gear reduction mechanism, the primary object of which is to gain power leverage from a relatively light or small power prime mover, which latter mechanisms are primarily intended for heavy duty service, and wherein speed reduction is only one incident of the main object of power service at the delivery end of the mechanism.

The mechanism of this invention contemplates a light power prime mover at the motivating end of the mechanism, which, in the event that the prime mover is an electric motor, presents an extreme speed reduction problem, to which this invention is addressed. Thus, it is a primary object hereof to effect an extreme speed reduction at the delivery end of the mechanism to service a light load, such for instance as a stoker for furnaces in private homes, or in any capacity in which a constant and light duty but low speed, is required.

In the most improved form of the invention, speed reduction is accomplished in stages or steps, and the first step or stage is a worm reduction while the last stage or step is a gear reduction but the invention, as claimed, resides in either or both irrespective of whether the structure is in the precise form shown.

The invention has many other features and objects which will be more fully described in connection with the accompanying drawings and which will be more particularly pointed out in and by the appended claims.

In the drawings:—

Fig. 2, is a sectional view taken on line 2—2 of Fig. 1, looking toward the right of the latter figure.

Fig. 3, is a fragmentary sectional view taken on line 3—3 of Fig. 4, showing a modified form of the invention.

Like characters of reference designate similar parts throughout the different figures of the drawings.

Figure 1:
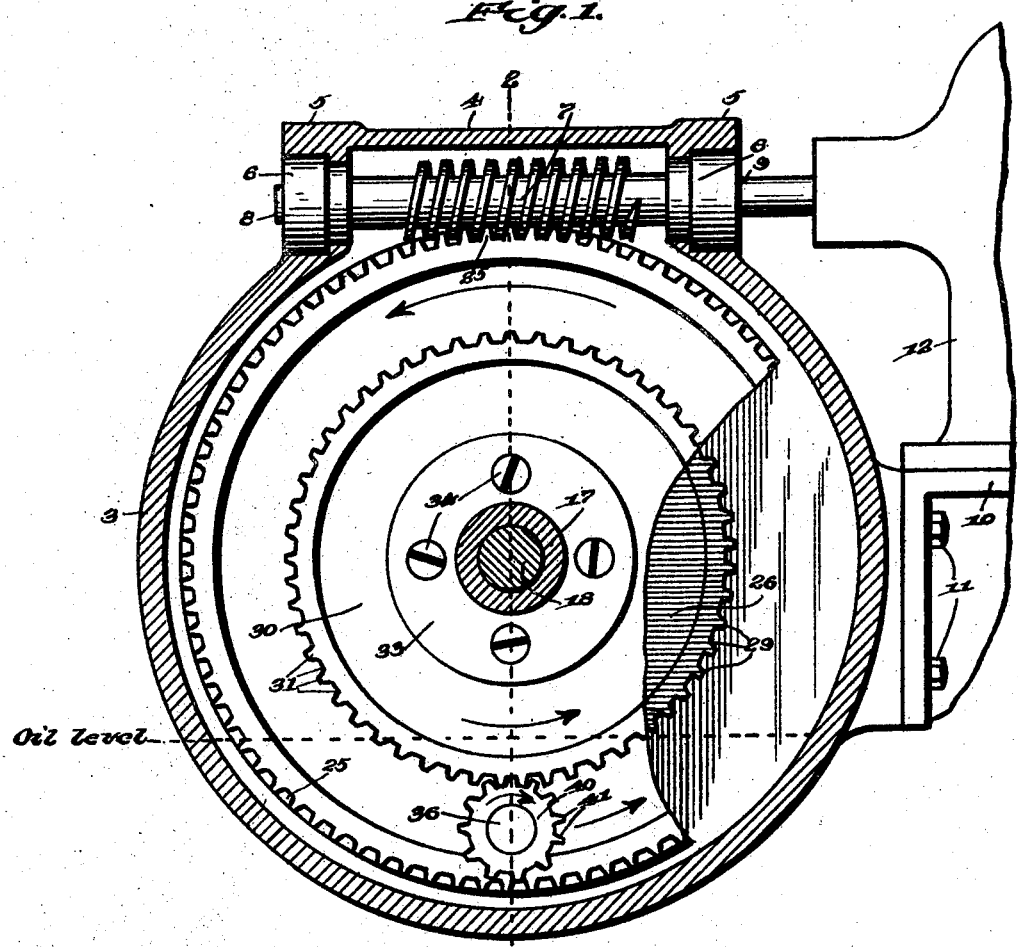
Fig. 1, is a vertical sectional view taken on line 1—1 of Fig. 2, looking toward the left of the latter figure, and illustrating the preferred form of this invention.

As the device of this invention is self oiling and self contained in a unitary structure, it is herein shown incorporated in a casing which is of generally cylindrical form, the same including a casing section and a cover section. Referring first to Figs. 1 and 2, the casing section includes a back wall 1, which is shown stiffened by an increased thickness 2, the back wall 1 having a cylindrical wall 3, extending horizontally as shown, to form an enclosing casing. Near the top, the cylindrical wall 3, has a bearing section 4, with journalling ends 5, in which suitable bearings 6, are secured in any desired manner. This journalling section 4, which opens into the interior of the casing, as shown in Fig. 1, may, in this construction, be termed a worm section, as it affords a journalling housing for a worm 7, the journal ends 8 and 9, of which, are afforded bearing support in the bearings 6. A supporting shelf 10, is suitably secured to casing 3, as at 11, and an electric motor 12, is shown mounted on shelf 10, and is in direct drive connection with worm 7, as shown.

A cover section is designated at 12, and is shown secured to the edge of wall 3, by screws 13, preferably in oil tight connection. The cover 12 and wall 1, have alined journal openings and a shaft structure is rotatively mounted in said openings, and we have shown the cover bossed at 16, in packing gland form. The improved shaft structure includes a sleeve 17, which is directly journalled in the back wall 1 and cover 12, and which may project from the cover side as shown. Within this sleeve 17, is a shaft 18, which is shown projecting beyond the ends of said sleeve and provided with polygonal portions 19 and 20, for non-rotatable connection with whatever devices are to be driven and which are therefore, the power delivery end or ends of the mechanism. The shaft 18, is non-rotatably connected with sleeve 17, in any suitable manner, as by a shearing pin 21, which is adapted to be sheared off, in case a piece of foreign material got into the stoker, or other driven device, causing sudden stoppage.

A worm wheel 22, is revolubly mounted on sleeve 17 and is provided with a laterally extending hub 23, which may be provided with oil ducts 24. Said worm wheel 22, is provided with peripherally disposed worm teeth 25, for mesh engagement with worm 7, as shown in Figs. 1 and 2, and from which worm wheel 22 is driven, this being the first step of speed reduction. Of course it is within the province of this invention, as claimed, to impart drive to the transmission or pinion carrying wheel 22, otherwise than by a worm. At this point, it may be informative to note that rotation of wheel 22, does not directly drive sleeve 17, as will later be more fully described.

Reference will next be made to the second and final speed reduction step or stage.

A relatively fixed gear wheel, which in the present construction is a stationary gear, is indicated at 26, and has a hub 27 that abuts against rear wall 1, of the casing. Means such as screws 28, rigidly secure wheel 26, in the position shown in Fig. 2, and it will be seen that the hub 23, of worm wheel 22, at the left of Fig. 2, abuts against hub 27, which engagement prevents wheel 22 from shifting to the left of said figure. Said wheel 26, has gear teeth 29, which are peripherally disposed. Although this wheel 26, is shown stationary, it functions, as will later appear, in a propulsive capacity.

A driven gear wheel is indicated at 30, which is disposed on the remaining side of wheel 22, said gear having peripherally disposed teeth 31. As shown, the gear wheels 26 and 30 are of the same diameter but gear 26, has a relatively lesser number of teeth than gear 30, for a purpose which will later appear. Said driven gear 30, transmits drive to sleeve 17, and the latter is provided with a wheel attaching flange 32 which is interposed between the right hand end of hub 23, viewing Fig. 2, and the hub 33, of wheel 30, the hub 33 abutting against cover 12. As will now be clear from reference to Fig. 2, there can be no lateral shifting of the assembled parts. Hub 33, is secured to flange 32, by means such as screws 34, whereby drive is transmitted from wheel 30, to the sleeve 17, and through shearing pin 21, to shaft 18.

It will now be clear that both wheels 26 and 30 are axially disposed with respect to worm wheel 22, and are of less diameter than the latter, the purpose of which will presently appear.

Reference will next be made to a part of the mechanism for obtaining the last stage speed reduction, which may be termed the primary speed reduction.

Near the periphery of worm wheel 22, is a hub 35, in which a transmission shaft 36, is revolubly mounted. Suitable lubricant ducts 37, are shown leading from the radially outermost part of hub 35, toward said shaft. On one end of said shaft 36, is keyed or suitably fixed a transmission pinion 38, having teeth 39, meshing with teeth 29, of fixed gear 26. On the remaining end of shaft 36, is a transmission pinion 40, suitably fixed or keyed to said shaft, and whose teeth 41, mesh with teeth 31, of driven gear 30.

It will now be clear that by making gears 26 and 30 of a smaller diameter than the worm wheel 22, we obtain the requisite clearance whereby the transmission pinions may be mounted on the worm wheel and still have peripheral mesh engagement with gears 26 and 30. The transmission pinions 38 and 40 are of the same diameter, and in the present construction, have the same number of teeth, and this feature, in combination with the feature of having the fixed and driven gears 26 and 30, of the same diameter, enables me to obtain a straight shaft transmission construction for transmitting motion from one side to the other of worm wheel 22.

Further, the disposition of gears 26 and 30, on opposite sides of worm wheel 22, is a facilitating factor in reducing the mechanism to great simplicity both in the matter of initial cost and assembly.

It will now be clear that with both gears 26 and 30, of the same diameter and the same number of teeth, and a like structural identity of the pinions 38 and 40, the latter would rotate idly about the peripheries of gears 26 and 30, without transmitting any drive to gear 30, whatever. If any movement of gear 30, occurred, under such tooth and diametrical identity of the pinions and gears, it would be an irregular and accidental movement and not one of a sustained character.

Therefore, it is a specific feature of this invention, in combination with the above general identity, to provide the fixed gear 26 with a slightly less number of teeth than the driven gear 30, whereby the bodily movement will cause gears 38 and 40 to rotate the driven gear 30. This arrangement is not essential to the invention and is, in the present construction, employed in order to impart to shaft 18, the same direction of rotation as that of worm 7. If it is desired to impart to shaft 18 a different or opposite direction of rotation to that shown in Fig. 1, that is, opposite to the direction of rotation of worm 7, then, and in that event, the driven gear 30, would have a lesser number of teeth than the fixed gear 26. Thus, it will now be clear that the real feature of the invention broadly resides in equipping one of the gears with a lesser number of teeth than the other, to afford the requisite differential transmission, and this is true, irrespective of whether the gears and pinions are of identical diameter, which latter construction for many reasons is preferred and advantageous, although not essential. The fact that the fixed gear 26, performs a propulsive function, will now be clear, even though it is a fixed gear.

It may also be stated that the pinion 40 not only imparts driving thrust to wheel 30, because of the rotary movement of said pinion, but also because of the bodily movement of the latter, the extent of rotary thrust being greater than that imparted by bodily movement of said pinion.

Although specific details form no part of the invention except as included in the claims, still, for the information of the public, and to graphically distinguish this invention from others, it may be well to give some detailed information regarding the speed reduction obtained by this device.

The original drawings herewith, show one type of mechanism and are drawn to scale, one half the size of numerous machines already built and tested, such machine being built in accordance with this invention. In this type of machine, we use a one quarter horse power electric motor having a load speed of approximately one thousand seven hundred and twenty-five (1725) revolutions per minute. The fixed gear 26, has fifty-two (52) teeth and the driven gear 30, has fifty-five (55) teeth, and with these proportions, we get a delivery speed of shaft 18, at the rate of approximately three-quarters of a revolution per minute. Thus, the foregoing shows that the speed reduction is extreme.

In the preferred construction, we have described a differential toothed transmission speed reduction device comprising spur gears and pinions, and in which two spur pinions are employed. We will next describe a modified form of the invention in which the gear wheels coact with the single gear to perform substantially the same function, in substantially the same way.

Figure 4:
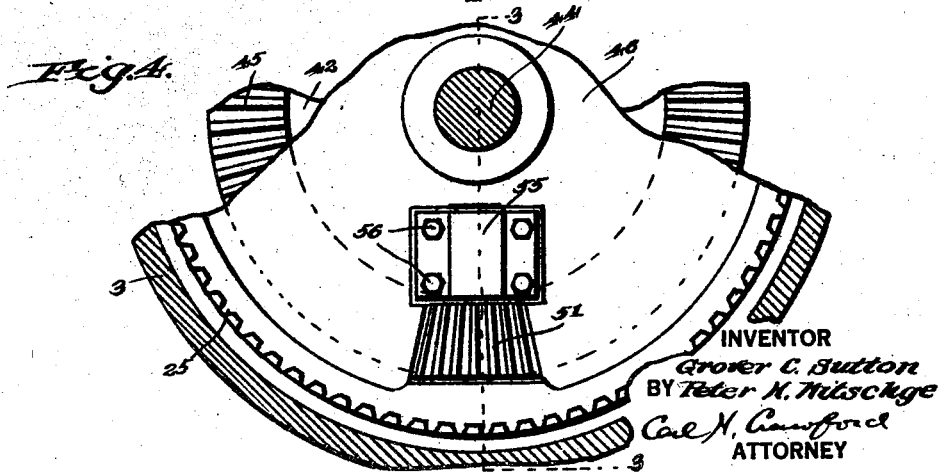
Fig. 4, is a sectional view taken on line 4—4 of Fig. 3.

Referring to Figs. 3 and 4, we have shown a fixed gear 42, secured to wall 1, by means such as screws 43, in axial relation to a shaft 44, which latter is suitably journalled in wall 1 and cover 12. This fixed wheel 42 is provided with bevelled teeth 45. A worm wheel 46, is rotatably mounted on shaft 44, between said fixed gear 42, and a like driven gear wheel 47, having bevelled teeth 48. Shaft 44, is provided with a wheel attaching flange 49, to which driven wheel 47 is secured by means such as screws 50, whereby drive will be imparted to shaft 44, by wheel 47.

A bevelled pinion 51, is carried by worm wheel 46, and is freely rotatable on a spindle 52, which may have its radially outer end 53, socketed in wheel 46, and its radially inner end 54, journalled in a bearing 55, that is secured by bolts 56, to wheel 46, as will now be clear. Either wheel 42 or 47, may have a lesser number of teeth than the other, to afford the requisite differential transmission action, and it will be clear that the wheel 46, is suitably cut away, to afford room to interpose gear 51 and the bearing 55.

In all other respects, the modified form is identical with the preferred form both in operation and structure, and hence no further detailed description is necessary.

It will be clear that in Figs. 1 and 2, the pinions 28 and 40, constitute a rotatable transmission gear structure and that the gear 51, in Figs. 3 and 4, also constitutes a rotatable transmission gear structure, and in each form, such structure meshes with those gear wheels disposed on opposite sides of the worm wheel to transmit motion from the relatively fixed gear wheel to the driven gear wheel.

In Fig. 1, the oil level in the casing is shown and it will be clear that the enlarged portion of the worm wheel 22, and the pinions, or in the modified form, the single bevel gear, when dipping down into the oil and ascending therefrom, will carry oil into effective lubricating relation to the gears and the teeth thereof. The teeth of the worm wheel will carry oil into range of their mesh engagement with the worm 7. However, the invention is operative and useful in the absence of a casing.

While specific forms of the invention have been shown, it is not desired that the invention should be limited thereto except for such limitations as the claims may import.

We claim:

1. In a speed reduction mechanism, a casing adapted to contain a lubricant in its lower portion and having side walls with alined journal openings therein, a sleeve journalled in said openings, a shaft in said sleeve and projecting therefrom, shearing means non-rotatably connecting said shaft and sleeve, a worm wheel rotatively mounted on said sleeve and projecting into the lubricant, a driven worm in the top of said casing meshing with said worm wheel, a gear wheel fixed to the inner face of one side of said casing axially with respect to said worm wheel and engaging the latter on one side thereof, said sleeve having a wheel attaching flange engaging the remaining side of said worm wheel to prevent lateral shifting movement of the latter on said sleeve, a driven gear wheel mounted on said sleeve axially with respect to said worm wheel and disposed between said flange and the remaining side of said casing and being fixed to said flange, said fixed and driven gear wheels being of the same diameter and said driven gear wheel having a slightly greater number of teeth than said fixed gear wheel, said worm wheel having connected transmission pinions one meshing with one gear wheel and the other meshing with the remaining gear wheel whereby an extreme speed reduction will be imparted to said shaft, and said pinions being mounted near the periphery of said worm wheel whereby they will descend into and carry the lubricant upwardly about said gear wheels and the teeth of said worm wheel serving to carry lubricant upwardly into the area of mesh engagement of said worm wheel with said worm.

2. In a light duty speed reduction mechanism for extreme speed ratio reduction, a worm wheel, a high speed driven worm driving said worm wheel and forming a minor speed reduction of the first stage, a relatively fixed gear wheel having a relatively lesser number of teeth and axially disposed on one side of said worm wheel, a driven gear wheel having a relatively increased number of teeth with respect to said first named gear wheel and axially disposed on the remaining side of said worm wheel and both of said gear wheels being of the same diameter and of reduced diameter with respect to said worm wheel, a transmission shaft rotatively journalled in said worm wheel near the periphery thereof and projecting laterally abreast of the peripheries of said gear wheels, transmission pinions of the same diameter and number of teeth fixed on the ends of said transmission shaft and one of said pinions meshing with said fixed gear wheel and the other of said pinions meshing with said driven gear wheel, whereby rotation of said worm wheel together with the difference in number of teeth of said gear wheels will impart a major stage of speed reduction to said driven gear wheel, and a shaft structure rotatively supporting said worm wheel and being fixed to said driven wheel for delivery of slow speed power.

In witness whereof, we have hereunto affixed our signatures.

GROVER C. SUTTON.
PETER H. WITSCHGE.